(12) United States Patent
Kase et al.

(10) Patent No.: US 6,411,588 B1
(45) Date of Patent: Jun. 25, 2002

(54) OPTICAL DATA RECORDING/REPRODUCING DEVICE

(75) Inventors: Toshiyuki Kase, Kanagawa-ken; Hiroshi Nishikawa, Tokyo, both of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/152,329

(22) Filed: Sep. 14, 1998

(30) Foreign Application Priority Data

Sep. 12, 1997 (JP) .............................. 9-248184

(51) Int. Cl.⁷ ................................ G11B 7/00
(52) U.S. Cl. ................... 369/112.02; 369/118
(58) Field of Search .................. 369/116, 120, 369/121, 47.5, 112.02, 118

(56) References Cited

U.S. PATENT DOCUMENTS

| 2,750,461 A | 6/1956 | Bunch |
| 3,244,917 A | 4/1966 | Gute |
| 3,354,833 A | 11/1967 | Laing |
| 4,088,914 A | 5/1978 | Aoki |
| 4,126,796 A | 11/1978 | Ito |
| 4,206,379 A | 6/1980 | Owda |
| 4,285,566 A | 8/1981 | Yamamoto |
| 4,297,713 A | 10/1981 | Ichikawa et al. |
| 4,351,596 A | 9/1982 | Ohniwa et al. |
| 4,466,088 A | 8/1984 | Trethewey |

(List continued on next page.)

FOREIGN PATENT DOCUMENTS

| EP | 0084727 | 8/1983 |
| EP | 0084728 | 8/1983 |
| EP | 0448362 | 9/1991 |
| EP | 0790512 | 8/1997 |
| EP | 0907163 | 4/1999 |
| GB | 378922 | 8/1932 |
| GB | 1314002 | 4/1973 |
| GB | 1457995 | 12/1976 |
| GB | 2000604 | 1/1979 |
| GB | 2086092 | 5/1982 |
| GB | 2193341 | 2/1988 |
| JP | 62262017 | 11/1987 |
| JP | 64-2015 | 1/1989 |
| JP | 5128561 | 5/1993 |
| JP | 8315404 | 11/1996 |
| WO | 90/08363 | 7/1990 |
| WO | 98/06095 | 2/1998 |
| WO | 98/49675 | 11/1998 |
| WO | 98/49684 | 11/1998 |

OTHER PUBLICATIONS

An article entitled "Trillions Of Bytes", by Eric Nee, which appeared in the Mar. 24, 1997 issue of Forbes magazine.
A screen capture of a page form TeraStor's website (dated Mar. 19, 1997) entitled "Architecture of TeraStor's Near–Field Technology".

(List continued on next page.)

*Primary Examiner*—Nabil Hindi
(74) *Attorney, Agent, or Firm*—Greenblum & Bernstein, P.L.C.

(57) ABSTRACT

Disclosed is an optical data recording/reproducing device which is provided with a laser diode for emitting laser beam, an illuminating optical system including an objective lens which converges the laser beam emitted by the laser diode on an optical disc, a monitoring optical system including a light receiving element which receives a part of the laser beam emitted by the laser diode, and a driving circuit which drives the laser diode in accordance with an output signal of the light receiving element. A coupling efficiency of the illuminating optical system and a coupling efficiency of the monitoring optical system are made substantially the same.

9 Claims, 3 Drawing Sheets

U.S. PATENT DOCUMENTS

Figure 1:
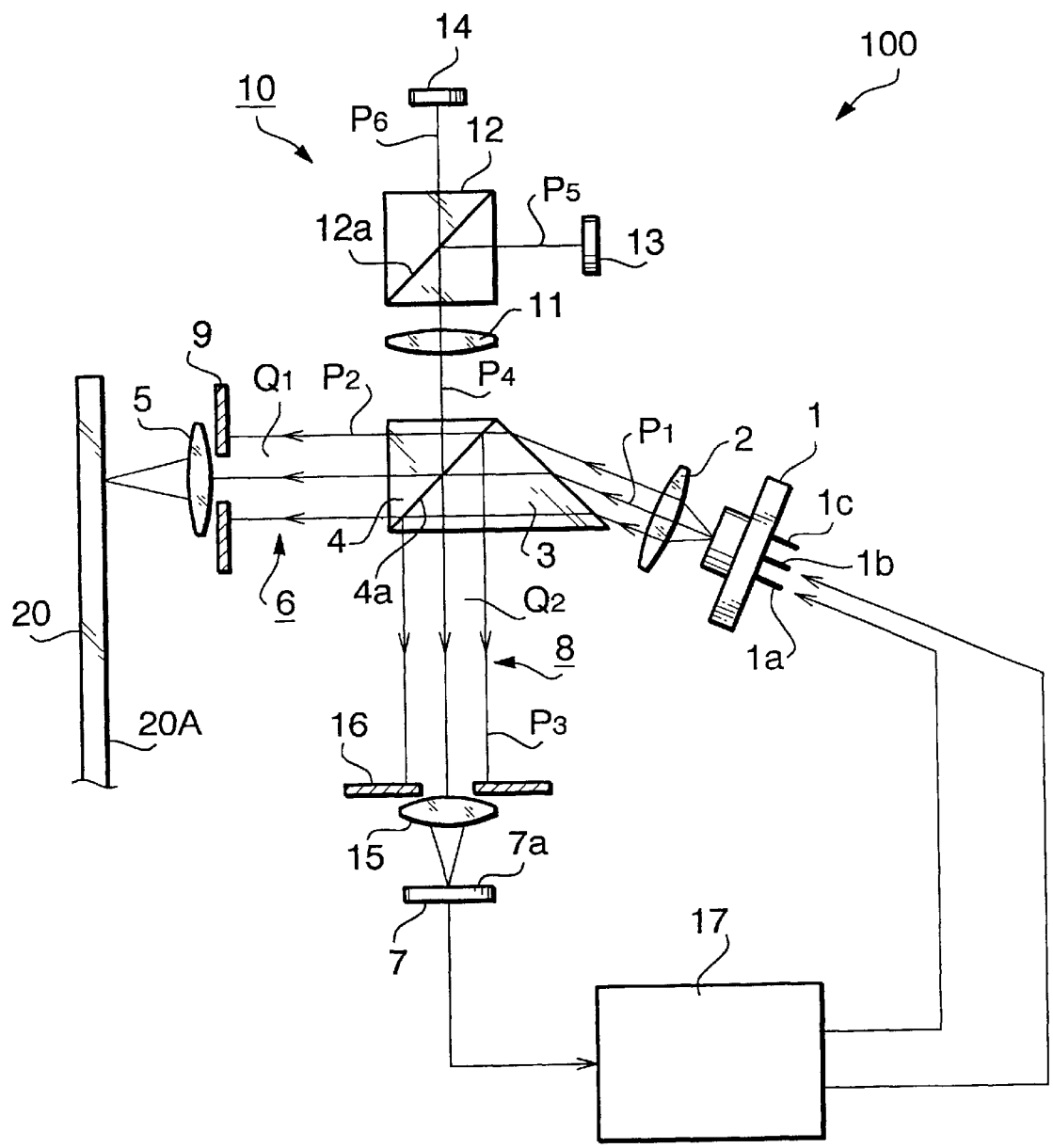

| | | | |
|---|---|---|---|
| 4,891,998 A | | 1/1990 | Tourville |
| 4,959,824 A | | 9/1990 | Ueda |
| 4,968,876 A | | 11/1990 | Iima |
| 5,125,750 A | | 6/1992 | Corle et al. |
| 5,126,899 A | | 6/1992 | Kanazawa |
| 5,136,559 A | | 8/1992 | Nakayama |
| 5,151,890 A | | 9/1992 | Yonekubo |
| 5,220,550 A | | 6/1993 | Nakayama |
| 5,254,893 A | | 10/1993 | Ide |
| 5,335,213 A | * | 8/1994 | Fukumoto et al. .......... 369/116 |
| 5,365,504 A | | 11/1994 | Noguchi |
| 5,420,848 A | | 5/1995 | Date et al. |
| 5,422,872 A | | 6/1995 | Hsu et al. |
| 5,444,683 A | | 8/1995 | Ishikawa |
| 5,461,498 A | | 10/1995 | Iwao |
| 5,517,474 A | | 5/1996 | Takamine |
| 5,532,480 A | | 7/1996 | Scofield |
| 5,550,800 A | * | 8/1996 | Zucker ....................... 369/116 |
| 5,564,585 A | | 10/1996 | Saitoh |
| 5,596,446 A | | 1/1997 | Plesko |
| 5,608,280 A | | 3/1997 | Tamemoto et al. |
| 5,610,752 A | | 3/1997 | Hayakawa |
| 5,625,244 A | | 4/1997 | Bradfield |
| 5,684,762 A | | 11/1997 | Kubo |
| 5,705,868 A | | 1/1998 | Cox et al. |
| 5,719,834 A | | 2/1998 | Futagawa et al. |
| 5,764,613 A | | 6/1998 | Yamamoto |
| 5,768,241 A | | 6/1998 | Kanazawa et al. |
| 5,793,723 A | * | 8/1998 | Okuyama et al. ........... 369/116 |
| 5,844,676 A | | 12/1998 | Southam et al. |
| 5,886,438 A | | 3/1999 | Kawanishi |
| 5,920,140 A | | 7/1999 | Nakagishi et al. |
| 5,966,347 A | * | 10/1999 | Fukada ....................... 369/116 |
| 6,061,317 A | * | 5/2000 | Shodo ........................ 369/116 |

OTHER PUBLICATIONS

An article entitled "In 1998, 10 GB Per Inch$^2$ Is Realized Using New Optical Recording Technology", appeared at pp. 148–151 of the Sep., 1997 Japanese language edition of Nikkei Byte magazine.

An article by B.D. Terris et al., entitled "Near–Field Optical Data Storage", Applied Physics Letters, vol. 68, pp. 141–143, Jan. 8, 1996.

Patent Abstracts of Japan, vol. 012, No. 140 (P–696), dated Apr. 18, 1988.

Patent Abstracts of Japan, vol. 017, No. 505 (P–1611), dated Sep. 10, 1993.

An article entitled "Optical Magnetic Disk Device Of U.S. TeraStor Succeeds Tracking Control—Track Pitch Of 0.34 μm Realized Using Two–Stage Servo", which appeared at pages 13 and 14 of the Japanese language magazine Nikkei Electronics, Sep. 22, 1997 (No. 699).

* cited by examiner

OPTICAL DATA RECORDING/REPRODUCING DEVICE

BACKGROUND OF THE INVENTION

The present invention relates to an optical data recording/reproducing device.

An optical data recording/reproducing device is generally provided with an illuminating optical system and a monitoring optical system. The illuminating optical system includes a laser diode for emitting a laser beam and an objective optical system which converges the laser beam emitted by the laser diode on a recording medium such as an optical disc. Further, a beam splitter is provided to split the laser beam emitted by the laser diode such that a part of the beam is directed to the objective optical system, and another part of the laser beam is directed to the monitoring optical system. The monitoring optical system is provided with a light receiving element for receiving the laser beam split by the beam splitter to detect intensity of the laser beam emitted by the laser diode. Based on the output of the light receiving element, a driving circuit of the laser diode controls the intensity of the laser beam emitted by the laser diode. Thus the intensity of the laser beam emitted by the laser diode is automatically adjusted.

The amount of light emerged from the objective lens is proportional to the amount of light received by the light receiving element. However, beam radiation angles of individual laser diodes may be different from each other. Accordingly, a relationship between an amount of light emerged from the objective lens and an amount of light incident on the light receiving element may be different among respective optical data recording/reproducing devices. Therefore, the driving circuit should be constituted to deal with any possible proportional relationship between the amount of light emerged from the objective lens and an amount of light incident on the light receiving element However, if a proportional coefficiency becomes too large, the driving circuit may not drive the laser diode, due to its limited dynamic range.

It may be possible to broaden the dynamic range of the driving circuit by modifying an electrical circuit thereof. However, the range which can be broadened by modifying the circuit is limited, and accordingly such a solution cannot be essential. Further, in order to broaden the dynamic range of the driving circuit, the circuit becomes complicated, which increases a manufacturing cost thereof.

Alternatively, only the laser diodes whose characteristics meet the dynamic range of the driving circuit are selected and used when the data recording/reproducing devices are assembled. However, if the step of selecting laser diodes is incorporated in the assembling procedure, the assembling procedure may take time and increases the manufacturing cost.

SUMMARY OF THE INVENTION

It is therefore an object of the invention to provide an optical data recording/reproducing device which is capable of compensating the individual differences of the characteristics of laser diodes, simplifying driving circuits, and adjusting the intensity of the laser beam emitted by the laser diode with suppressing increase of the manufacturing cost.

For the above object, according to the present invention, there is provided an optical data recording/reproducing device, which is provided with a laser diode for emitting laser beam, an illuminating optical system including an objective lens which converges the laser beam emitted by the laser diode on an optical disc, a monitoring optical system including a light receiving element which receives a part of the laser beam emitted by the laser diode, and a driving circuit which drives the laser diode in accordance with an output signal of the light receiving element. It should be noted that a first coupling efficiency of the illuminating optical system and a second coupling efficiency of the monitoring optical system are made substantially the same.

With this constitution, the amount of light emerged from the objective lens is proportional to the amount of light received by the light receiving element. Therefore, the driving circuit can be made simple since characteristics of the laser diode does not affect driving of the laser diode.

Optionally, the device may be provided with a beam splitter which divides the laser beam emitted by the laser diode into a first beam directed to the illuminating optical system and a second beam directed to the monitoring optical system.

The beam splitter may has a reflection surface which reflects a part of light incident thereon, and allows the other to pass through. The reflection ratio of the reflection surface define a proportional coefficiency between the amount of light emerged from the objective lens and the amount of light received by the light receiving element.

It should be noted that the first coupling efficiency is defined as a ratio of an amount of light emerged from the objective lens to an amount of light entering the illuminating optical system, and the second coupling efficiency is defined as a ratio of an amount of light received by the light receiving element to an amount of light entering the monitoring optical system.

In particular, the illuminating optical system may include an aperture which regulates amount of light incident on the objective lens, the aperture defining the first coupling efficiency.

In this case, the monitoring optical system may include a second aperture which regulates amount of light incident on the light receiving element, the second aperture defining the second coupling efficiency.

Optionally, the monitoring optical system may include a converging lens between the second aperture and the light receiving element, light passed through the second aperture being converged by the converging lens.

Alternatively, the light receiving element has a light receiving area which is configured to receive a part of the second light so as to regulate amount of light received by the light receiving element, a size of the light receiving area defining the second coupling efficiency.

Still alternatively, the monitoring optical system may include an imaging lens mounted on a body member, the light receiving element being accommodated in the body member, and only a part of the second light incident on the imaging lens passing through the imaging lens and directed to the light receiving element, diameter of the imaging lens defining the second coupling efficiency.

Optionally, the imaging lens may have a hemispherical shape.

According to another aspect of the invention, there is provided an optical data recording/reproducing device, which is provided with, a laser diode for emitting laser beam, an illuminating optical system including an objective lens which converges the laser beam emitted by the laser diode on an optical disc. A monitoring optical system may include a light receiving element which receives a part of the laser beam emitted by the laser diode, and a first coupling efficiency of the illuminating optical system and a second coupling efficiency of the monitoring optical system are made substantially the same.

Optionally, the device may include a beam splitter which divides the laser beam emitted by the laser diode into a beam directed to the illuminating optical system and a beam directed to the monitoring optical system.

According to further aspect of the invention, there is provided an optical data recording/reproducing device, which is provided with a laser diode for emitting laser beam, an illuminating optical system including an objective lens which converges the laser beam emitted by the laser diode on an optical disc, and a monitoring optical system including a light receiving element which receives a part of the laser beam emitted by the laser diode. The device is constituted such that amount of light emerged from the objective lens is proportional to the amount of light received by the light receiving element regardless of characteristics of the laser diode.

BRIEF DESCRIPTION OF THE ACCOMPANYING DRAWINGS

Figure 2:
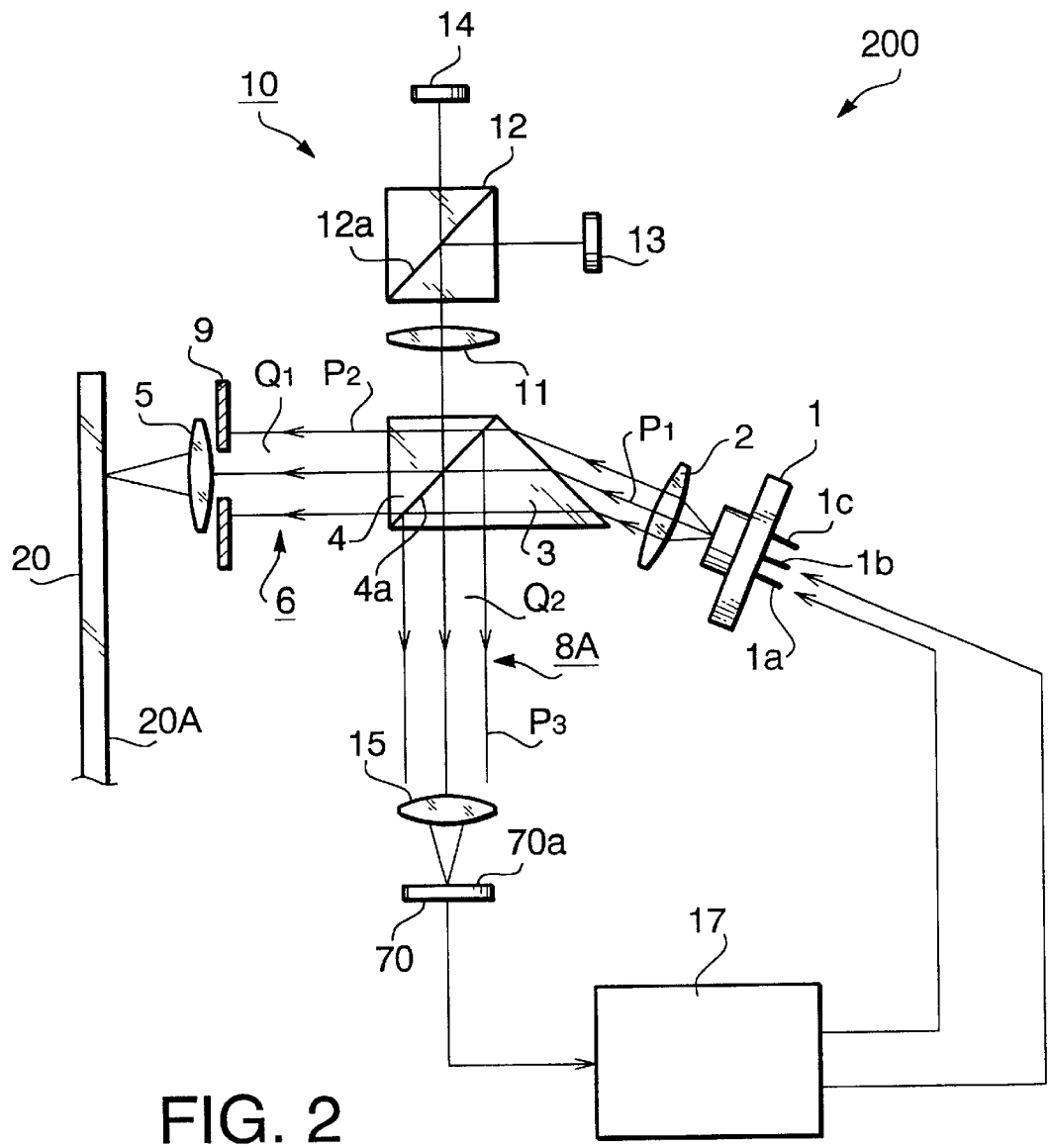
Figure 3:
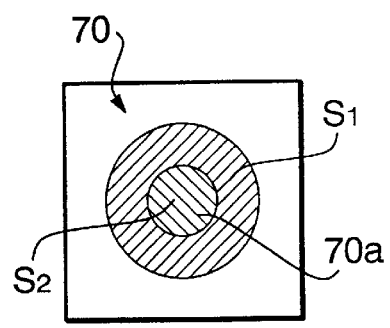
Figure 4:
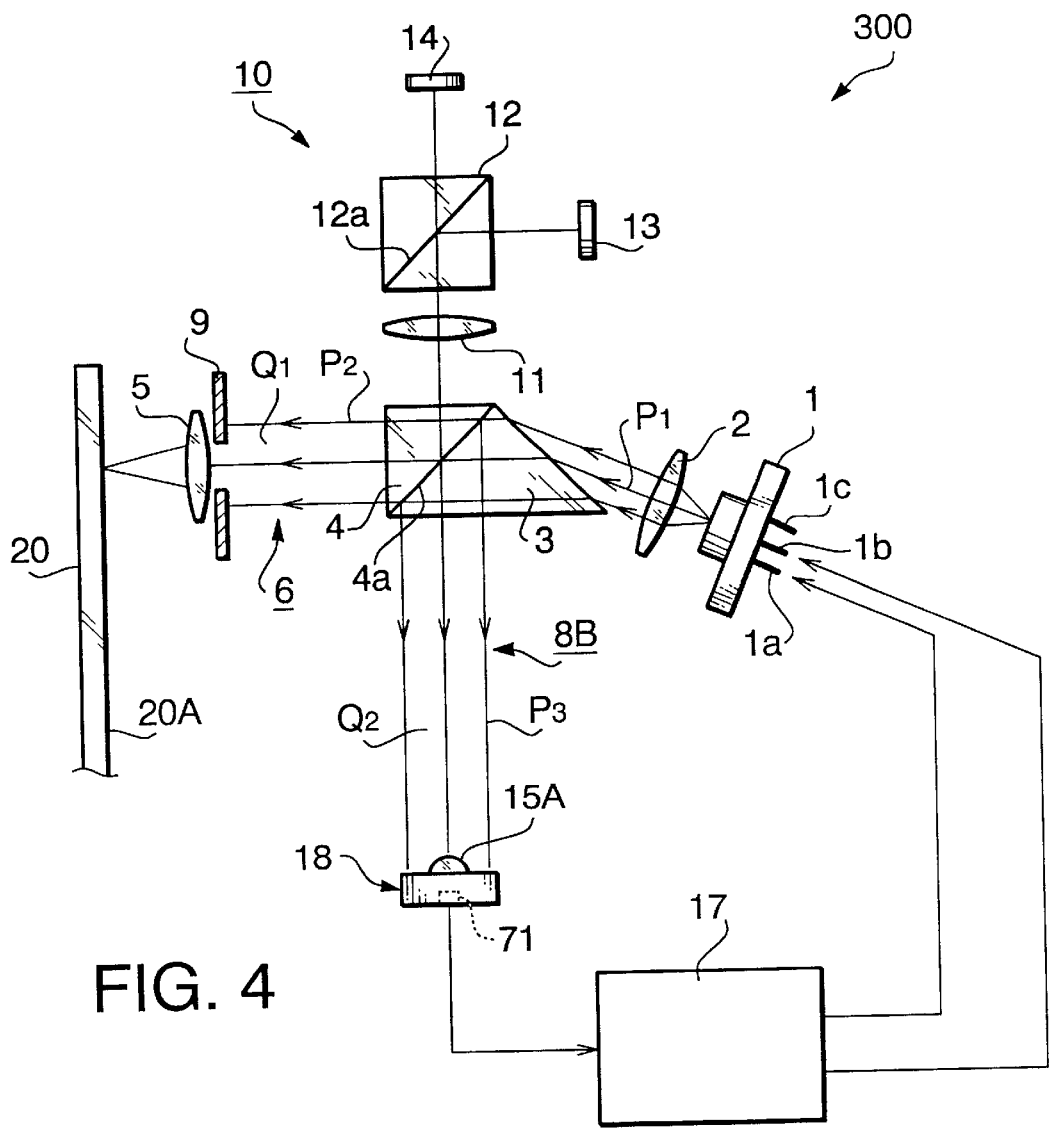
Figure 5:
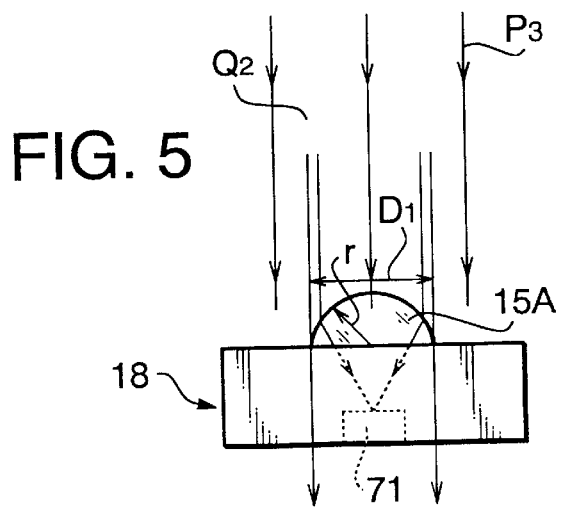

FIG. 1 schematically shows a structure of an optical system of an optical data recording/reproducing device according to a first embodiment of the invention;

FIG. 2 schematically shows a structure of an optical system of an optical data recording/reproducing device according to a second embodiment of the invention;

FIG. 3 is a plan view of a photo sensor of the optical system shown in FIG. 2;

FIG. 4 schematically shows a structure of an optical system of an optical data recording/reproducing device according to a third embodiment of the invention; and FIG. 5 is a side view of elements of a module shown in FIG. 4.

DESCRIPTION OF THE EMBODIMENTS

First Embodiment

FIG. 1 schematically shows a structure of an optical system 100 for an optical data recording/reproducing device according to a first embodiment of the invention.

The optical system 100 is provided with a laser diode 1, a collimating lens 2, a beam shaping prism 3, and a beam splitter 4.

The laser diode 1 has a drive terminal 1a, a common terminal 1b, and a monitor terminal 1c. The monitor terminal 1c is to be used for monitoring the laser beam emitted by the laser diode. In the embodiments, however, a separate monitoring system is provided, and therefore the terminal 1c is not used.

The laser beam P1 emitted by the laser diode 1 is made into a parallel beam having an elliptical cross section by a collimating lens 2. Then, the beam is incident on the beam shaping prism 3 so that the elliptical cross section is changed to a circular cross section. The beam is then directed to the beam splitter 4, with which the beam is split into two beams P2 and P3. The beam P2 is directed to an illuminating optical system 6 which includes an aperture 9 and an objective lens 5. A part of the beam P2 passed through the aperture 9 is converged on a data recording surface 20A of an optical disc 20 by the objective lens 5. The beam P3 is directed to a light receiving element 7 which includes an aperture 16, a converging lens 15, and a light receiving element 7. The aperture size of the aperture 16 is the same as the aperture size of the aperture 9.

The light beam reflected by the data recording surface 20A of the optical disc 20 passes through the objective lens 5 and the aperture 9, and is directed to the beam splitter 4. On the reflection surface 4a of the beam splitter 4, the beam directed from the optical disc 20 is reflected towards a data reproducing optical system 10.

The data reproducing optical system 10 includes an imaging lens 11, a beam splitter 12, and first and second photo sensors 13 and 14. The beam P4 reflected by the reflection surface 4a of the beam splitter 4 is incident on a reflection surface 12a of the beam splitter 12 via the imaging lens 11, and is split into two beams P5 and P6 respectively converged on the first and second photo sensors 13 and 14.

Output signal of the first sensor 13 is used as a data detection signal for detecting data recorded on the data recording surface 20A of the optical disc 20. Output signal of the second sensor 14 is used as a tracking error signal and a focusing error signal to be used for controlling a position of the objective lens 5 with respect to the optical disc 20.

The beam reflected by the reflection surface 4a of the beam splitter 4 is converged on the light receiving element 7. Output signal of the light receiving element 7 is transmitted to a driving circuit 17 for driving the laser diode 1. The driving circuit 17 drives, based on the signal transmitted from the light receiving element 7, the laser diode 1 so that the intensity of the laser beam emitted by the laser diode 1 is maintained constant.

In this embodiment, a first coupling efficiency, which is a coupling efficiency of the illuminating optical system 6, is substantially the same as a second coupling efficiency, which is a coupling efficiency of the monitoring optical system 8. It should be noted that, in this specification, the first coupling efficiency is defined as a ratio of quantity of the light emerged from the objective lens 5 to the quantity of the light proceeding along the optical path of the illuminating optical system 6, and the second coupling efficiency is defined as a ratio of quantity of the light received by the light receiving element 7 to the quantity of the light proceeding along the optical path of the monitoring optical system 8.

In the optical data recording/reproducing device, output power of the laser beam of the laser diode 1 is defined as the quantity of the laser beam having been passed throughout the objective lens 5.

The output power (e.g., quantity) Po of the laser beam is therefore expressed by the following equation (1):

$$Po = Co \times (1 - Rp) \times To \times Pi \tag{1}$$

where,

Co is the first coupling efficiency, i.e., the coupling efficiency of the illuminating optical system 6;

Rp is a reflection ratio of the beam splitter 4;

To is a transmittance ratio of the optical elements of the illuminating optical system 6 excluding the beam splitter 4; and Pi is the power (quantity of light) of the laser beam emitted by the laser diode 1.

The power Pa of the laser beam received by the light receiving element 7 is expressed by the following equation (2):

$$Pa = Ca \times Rp \times Ta \times Pi \tag{2}$$

where,

Ca is the second coupling efficiency, the coupling ratio of the monitoring optical system 8; and Ta is a transmittance ratio of the optical elements of the monitoring optical system 8 excluding the beam splitter 4.

By deleting the power Pi from the equations (1) and (2), the following equation is obtained.

$$Pa=(Ca \times Rp \times Ta \times Po)/(Co \times (1-Rp) \times To) \quad (3)$$

If the coupling efficiency Ca is substantially equal to the coupling efficiency Co, the following equation (4) is obtained.

$$Pa=(Rp \times Ta \times Po)/[(1-Rp) \times To] \quad (4)$$

In equation (4), transmission ratios Ta and To can be considered to be substantially the same. Thus, equation (4) can be modified to equation (5) below.

$$Pa=Po \times Rp/(1-Rp) \quad (5)$$

Further, since the reflection ratio Rp of the beam splitter 4 is intrinsic to the reflection surface, and can be considered to be constant, Rp/(1−Rp) is also considered to be constant. Therefore, according to equation (5), Pa is proportional to Po.

Accordingly, if the coupling efficiencies in the illuminating optical system 6 and in the monitoring optical system 8 are made substantially the same, the laser diode 1 can be driven accurately based on the quantity of the light received by the light receiving element 7 independently of the characteristics (e.g., the beam radiation angle) of the laser diode 1. Therefore, the driving circuit 17 can be made simple, and manufacturing cost can be reduced.

Second Embodiment

FIG. 2 shows an optical system 200 according to a second embodiment of the invention. To the elements similar to those employed in the first embodiment the same reference numerals are assigned, and only different portions are described.

A difference between the optical systems 100 and 200 is a constitution of a monitoring optical system. In the second embodiment, a monitoring optical system 8A is provided. In the monitoring optical system 8A, the aperture 16, which defines the coupling ratio of the monitoring optical system 8 in the first embodiment, is not provided. Instead, in the second embodiment, a coupling efficiency Ca is defined as a ratio of amount of laser beam passing through the optical path Q2 of the monitoring optical system 8 to amount of laser beam received by the light receiving element 7. It should be noted that, a ratio of an area S1 of a cross section of the beam proceeding along the optical path Q2 of the monitoring optical system 8 to an area S2 of the light receiving surface 70a of a light receiving element 70 is set to be equal to a ratio of Ca to Co.

Although the imaging lens 15 is inserted within the optical path Q2 of the monitoring optical system 8A in the second embodiment, the imaging lens 15 could be omitted in the monitoring optical system 8A since the amount of light received by the light receiving element 70 can be adjusted by changing the area of the light receiving surface 70a.

Third Embodiment

FIG. 4 shows an optical system 300 of the optical data recording/reproducing device according to a third embodiment of the invention. To the elements commonly used in the first and third embodiments, the same reference numbers are assigned, and description is made on the elements which are different from the first embodiment.

A difference between the optical systems 100 and 300 is a constitution of a monitoring optical system. In the third embodiment, a monitoring optical system 8B is provided. In the monitoring optical system 8B, the aperture 16, which defines the coupling ratio of the monitoring system 8 in the first embodiment is not provided.

In the third embodiment, as shown in an enlarged view in FIG. 5, a light receiving element 71 and an imaging lens 15A are incorporated integrally in a module unit 18. The imaging lens 15 is formed to have a hemispherical shape, and mounted on a body of the module unit 18 with its planner surface facing the module unit 18. Thus, only a part of the beam incident on the imaging lens 15 is converged thereby and incident on the light receiving element 71. Accordingly, the effective diameter D1 of the imaging lens functions as the aperture 16 in the first embodiment.

As described above, the optical data recording/reproducing device according to the present invention, the intensity of the laser beam emitted by the laser diode is proportional to the intensity of light received by the light receiving element, and the relationship depends only on the reflection ratio Rp of the beam splitter 4, regardless of the individual difference of the radiation angles of the laser diodes, Therefore, electrical circuits can be simplified, and assembling costs can be reduced.

The present disclosure relates to subject matter contained in Japanese Patent Application No. HEI 09-248184, filed on Sep. 12, 1997, which is expressly incorporated herein by reference in its entirety.

What is claimed is:

1. An optical data recording/reproducing device, comprising:

a laser diode that emits a laser beam;

an illuminating optical system that includes an objective lens that converges said laser beam emitted by said laser diode on an optical disc and an aperture which regulates an amount of light incident on said objective lens;

a monitoring optical system that includes a lens element and a light receiving element that receives a part of said laser beam emitted by said laser diode;

a beam splitter that divides said laser beam emitted by said laser diode into a first beam directed to said illuminating optical system and a second beam directed to said monitoring optical system; and a driving circuit that drives said laser diode in accordance with an output signal of said light receiving element, wherein a first coupling efficiency of said illuminating optical system and a second coupling efficiency of said monitoring optical system are made substantially the same, said first coupling efficiency being defined as a ratio of an amount of light emerging from said objective lens to an amount of light entering said illuminating optical system, said second coupling efficiency being defined as a ratio of an amount of light received by said light receiving element to an amount of light entering said monitoring optical system, said objective lens and said aperture defining said first coupling efficiency.

2. The optical data recording/reproducing device according to claim 1, wherein said monitoring optical system includes a second aperture which regulates amount of light incident on said light receiving element, said second aperture defining said second coupling efficiency.

3. The optical data recording/reproducing device according to claim 2, wherein said monitoring optical system includes a converging lens between said second aperture and said light receiving element, light passed through said second aperture being converged by said converging lens.

4. The optical data recording/reproducing device according to claim 1, wherein said light receiving element has a light receiving area which is configured to receive a part of said second beam so as to regulate amount of light received by said light receiving element, a size of said light receiving area defining said second coupling efficiency.

5. The optical data recording/reproducing device according to claim 1, wherein said monitoring optical system includes an imaging lens mounted on a body member, said light receiving element being accommodated in said body member, and only a part of said second beam incident on said imaging lens passing through said imaging lens and directed to said light receiving element, diameter of said imaging lens defining said second coupling efficiency.

6. The optical data recording/reproducing device according to claim 5, wherein said imaging lens has a hemispherical shape.

7. An optical data recording/reproducing device, comprising:
   a laser diode that emits a laser beam;
   an illuminating optical system that includes an objective lens which converges said laser beam emitted by said laser diode on an optical disc and an aperture which regulates an amount of light incident on said objective lens; and
   a monitoring optical system that includes a lens element and a light receiving element which receives a part of said laser beam emitted by said laser diode,
   wherein a first coupling efficiency of said illuminating optical system and a second coupling efficiency of said monitoring optical system are made substantially the same, said objective lens and said aperture defining said first coupling efficiency.

8. The optical data recording/reproducing device according to claim 7, further comprising a beam splitter which divides said laser beam emitted by said laser diode into a first beam directed to said illuminating optical system and a second beam directed to said monitoring optical system.

9. An optical data recording/reproducing device, comprising:
   a laser diode that emits a laser beam;
   an illuminating optical system that includes an objective lens which converges said laser beam emitted by said laser diode on an optical disc and an aperture that regulates an amount of said laser beam incident on said objective lens; and
   a monitoring optical system that includes a lens element and a light receiving element which receives a part of said laser beam emitted by said laser diode,
   wherein an amount of light emerging from said objective lens is proportional to an amount of light received by said light receiving element regardless of characteristics of said laser diode, said objective lens and said aperture defining a first coupling efficiency.

* * * * *